US012726585B2

(12) United States Patent
Kouno et al.

(10) Patent No.: US 12,726,585 B2
(45) Date of Patent: Sep. 1, 2026

(54) VIDEO PROCESSING METHOD, VIDEO PROCESSING DEVICE, AND RECORDING MEDIUM

(71) Applicant: Panasonic Intellectual Property Management Co., Ltd., Osaka (JP)

(72) Inventors: Kazuhiko Kouno, Osaka (JP); Toshiya Noritake, Osaka (JP); Keisuke Shinno, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 253 days.

(21) Appl. No.: 18/706,230

(22) PCT Filed: Nov. 17, 2022

(86) PCT No.: PCT/JP2022/042774
§ 371 (c)(1),
(2) Date: Apr. 30, 2024

(87) PCT Pub. No.: WO2023/095718
PCT Pub. Date: Jun. 1, 2023

(65) Prior Publication Data

US 2026/0129143 A1 May 7, 2026

(30) Foreign Application Priority Data

Nov. 29, 2021 (JP) ................................. 2021-192625

(51) Int. Cl.
*H04N 5/57* (2006.01)
*G06T 5/92* (2024.01)
*H04N 5/20* (2006.01)

(52) U.S. Cl.
CPC ................. *H04N 5/57* (2013.01); *G06T 5/92* (2024.01); *H04N 5/20* (2013.01); *G06T 2207/10016* (2013.01)

(58) Field of Classification Search
CPC ... H04N 5/57; H04N 5/20; G06T 5/92; G06T 2207/10016
(Continued)

(56) References Cited

U.S. PATENT DOCUMENTS

2005/0117813 A1 6/2005 Nishida et al.
2005/0231457 A1 10/2005 Yamamoto et al.
(Continued)

FOREIGN PATENT DOCUMENTS

JP 2004-194311 A 7/2004
JP 2007-116593 A 5/2007
(Continued)

OTHER PUBLICATIONS

Extended European Search Report dated Feb. 26, 2025 issued in the corresponding European Patent Application No. 22898502.4.
(Continued)

*Primary Examiner* — Ali Bayat
(74) *Attorney, Agent, or Firm* — Rimon P.C.

(57) ABSTRACT

A video processing method includes: obtaining a first video signal; detecting, in a region of a first video represented by the first video signal obtained, a first region including a graphic different from a main video; calculating a first peak luminance of a second region that is the region of the first video excluding the first region; performing a tone mapping process on the first video, the tone mapping process decreasing a luminance higher than the first peak luminance; and outputting a second video signal representing a second video after the tone mapping process.

7 Claims, 14 Drawing Sheets

(58) Field of Classification Search
USPC .......................................................... 382/274
See application file for complete search history.

(56) References Cited

U.S. PATENT DOCUMENTS

| | | | | |
|---|---|---|---|---|
| 2006/0158556 | A1* | 7/2006 | Lyu .................... | H04N 5/44504 348/465 |
| 2010/0328529 | A1 | 12/2010 | Hirayama et al. | |
| 2017/0358064 | A1* | 12/2017 | Hendry ..................... | G06T 5/92 |
| 2018/0270512 | A1* | 9/2018 | Tsukagoshi ........ | H04N 21/4884 |
| 2018/0278985 | A1* | 9/2018 | De Haan .............. | H04N 19/182 |
| 2019/0251680 | A1* | 8/2019 | Kozuka .................... | H04N 5/66 |
| 2021/0201041 | A1* | 7/2021 | Rao ........................ | G06V 10/56 |

FOREIGN PATENT DOCUMENTS

| | | | |
|---|---|---|---|
| JP | 2008-252561 | A | 10/2008 |
| JP | 2011-015068 | A | 1/2011 |
| JP | 2016-144171 | A | 8/2016 |
| WO | 2010/067456 | A1 | 6/2010 |

OTHER PUBLICATIONS

Japanese Office Action dated Nov. 19, 2024 issued in the corresponding Japanese Patent Application No. 2023-563658.
International Search Report dated Jan. 31, 2023 issued in International Patent Application No. PCT/JP2022/042774, with English translation.

* cited by examiner (a)
HDR EOTF
(Example: PQ)
10,000 nit
Defined by luminance absolute value
0 nit
min
max
Code word (10 bit)
(b)
SDR EOTF
100%
Defined by luminance relative value
0%
min
max
Code word (10 bit)

FIG. 4

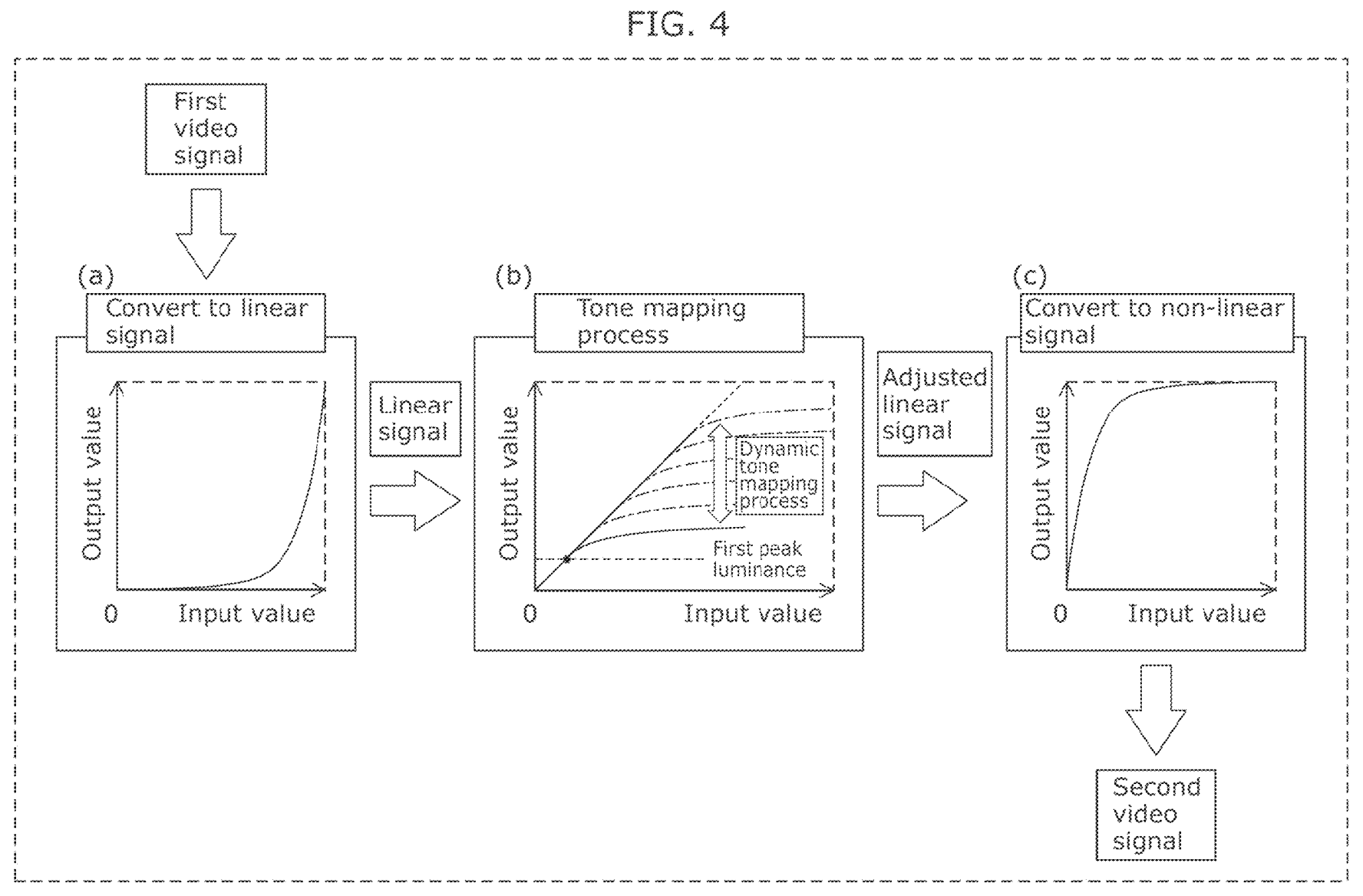

First video signal (a) Convert to linear signal

Output value

0

Input value

Linear signal (b) Tone mapping process

Output value

0

Input value

Dynamic tone mapping process

First peak luminance

Adjusted linear signal (c) Convert to non-linear signal

Output value

0

Input value

Second video signal

VIDEO PROCESSING METHOD, VIDEO PROCESSING DEVICE, AND RECORDING MEDIUM

CROSS-REFERENCE OF RELATED APPLICATIONS

This application is the U.S. National Phase under 35 U.S.C. § 371 of International Patent Application No. PCT/JP2022/042774, filed on Nov. 17, 2022, which in turn claims the benefit of Japanese Patent Application No. 2021-192625, filed on Nov. 29, 2021, the entire disclosure of which Application is incorporated by reference herein.

TECHNICAL FIELD

The present disclosure relates to a video processing method, a video processing device, and a recording medium.

BACKGROUND ART

Patent Literature (PTL) 1 discloses a video reproduction device that extracts, from a video signal, a main video signal and sub video information such as subtitles, adds a sub video to a main video, and outputs the video to an external display device.

CITATION LIST

Patent Literature

[PTL 1] Japanese Unexamined Patent Application Publication No. 2004-194311

[PTL 2] Japanese Unexamined Patent Application Publication No. 2011-015068

SUMMARY OF INVENTION

Technical Problem

However, under the technology according to PTL 1, in a video into which a sub video (graphics) such as subtitles is embedded, it is difficult to adjust the luminance of the sub video.

The present disclosure provides a video processing method or the like that allows the adjustment of the luminance of graphics.

Solution to Problem

A video processing method according to the present disclosure includes: obtaining a first video signal; detecting, in a region of a first video represented by the first video signal obtained, a first region including a graphic different from a main video; calculating a first peak luminance of a second region that is the region of the first video excluding the first region; performing a tone mapping process on the first video, the tone mapping process decreasing a luminance higher than the first peak luminance; and outputting a second video signal representing a second video after the tone mapping process.

Moreover, a video processing device according to the present disclosure includes: an obtainer that obtains a first video signal; a detector that detects, in a region of a first video represented by the first video signal obtained, a first region including a graphic different from a main video; a calculator that calculates a first peak luminance of a second region that is the region of the first video excluding the first region; a tone mapping processor that performs a tone mapping process on the first video, the tone mapping process decreasing a luminance higher than the first peak luminance; and an outputter that outputs a second video signal representing a second video after the tone mapping process.

It is to be noted that these general or specific aspects may be implemented as a system, an integrated circuit, a computer program, or a computer-readable recording medium such as a CD-ROM, or any combination of devices, systems, methods, integrated circuits, computer programs and recording media.

Advantageous Effects of Invention

The video processing method or the like according to the present disclosure allows the adjustment of the luminance of graphics embedded into a video.

BRIEF DESCRIPTION OF DRAWINGS

FIG. 4 is a diagram for describing processes performed by a first converter, a tone mapping processor, and a second converter.

DESCRIPTION OF EMBODIMENTS

Figure 1:
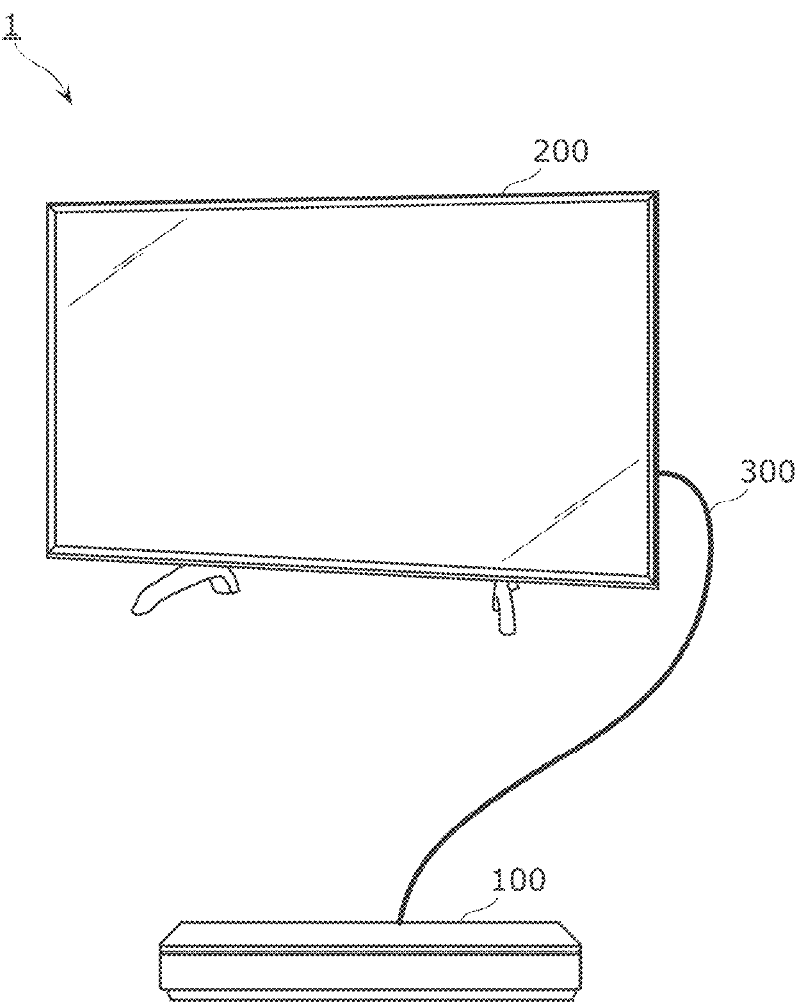
FIG. 1 is a drawing illustrating the configuration of an AV system according to Embodiment 1.

Underlying Knowledge Forming Basis of the Present Disclosure

Regarding the video reproduction device described in section [Background Art], the inventors found that there is the following problem.

The video reproduction device disclosed in PTL 1 generates a main video based on a main video signal, generates a sub video based on sub video information, and outputs, to a display, a video obtained by overlaying the sub video on the main video. Accordingly, luminance adjustment can be independently performed on the main video and the sub video, and thus the luminance of the sub video can be easily adjusted according to the luminance of the main video.

However, when the video reproduction device obtains the video signal of a video in which the sub video is already overlaid on the main video, this video signal does not include sub video information and is of the video into which the sub video is embedded. Accordingly, it is difficult to independently perform the luminance adjustment on the main video and the sub video. Therefore, it is difficult to adjust the luminance of the sub video according to the luminance of the main video.

In order to solve the above problem, the video processing device according to the present disclosure: obtains a first video signal; detects, in a region of a first video represented by the first video signal obtained, a first region including a graphic different from a main video; calculates a first peak luminance of a second region that is the region of the first video excluding the first region; performs, on the first video, a tone mapping process of decreasing a luminance higher than the first peak luminance; and outputs a second video signal representing a second video after the tone mapping process.

With this, the first peak luminance of the second region that is the region of the video excluding the first region including graphics is calculated, and the tone mapping process of decreasing a luminance higher than the first peak luminance is performed on the video. In other words, in the video, a luminance higher than the first peak luminance which is the peak luminance of the main video is decreased. Accordingly, when the video includes a region having a luminance higher than that of the main video, i.e., when the first region includes a region having a luminance higher than that of the main video, it is possible to decrease the luminance of the region having a luminance higher than that of the main video. Accordingly, it is possible to easily adjust the luminance of the first region including graphics.

Moreover, the first video is a moving picture including frames, and detection of the first region, calculation of the first peak luminance, and the tone mapping process may be performed for each of the frames.

With this, the video processing device performs the processes for each of the frames included in the video, and thus it is possible to perform the tone mapping process according to the luminance of each frame.

Moreover, in detecting the first region, for each of one or more sub regions constituting a predetermined third region in the region of the first video, a second peak luminance of the sub region may be calculated, and a region formed by combining one or more of the one or more sub regions, each having the second peak luminance higher than a predetermined threshold may be detected as the first region.

Accordingly, it is possible to easily detect the first region including graphics without performing a complicate process.

Moreover, the tone mapping process need not decrease a luminance lower than or equal to the first peak luminance.

Accordingly, it is possible to decrease the luminance of the graphics without decreasing the luminance of the main video when the luminance of the graphics is higher than the luminance of the main video.

Moreover, when a luminance input value is in a range of 0 to the first peak luminance, inclusive, the tone mapping process may output a value equal to the luminance input value as an output value.

Accordingly, it is possible to decrease the luminance of the graphics while keeping the luminance of the main video when the luminance of the graphics is higher than the luminance of the main video.

Moreover, when a luminance input value is in a range above the first peak luminance, the tone mapping process may output an output value corresponding to the luminance input value in a relationship in which a luminance output value increases at an increase rate as the luminance input value increases, where the increase rate decreases with an increase in the luminance input value.

Accordingly, it is possible to decrease the luminance of the graphics to cause less feeling of strangeness when the luminance of the graphics is higher than the luminance of the main video.

Moreover, the video processing device according to the present disclosure includes: an obtainer that obtains a first video signal; a detector that detects, in a region of a first video represented by the first video signal obtained, a first region including a graphic different from a main video; a calculator that calculates a first peak luminance of a second region that is the region of the first video excluding the first region; a tone mapping processor that performs a tone mapping process on the first video, the tone mapping process decreasing a luminance higher than the first peak luminance; and an outputter that outputs a second video signal representing a second video after the tone mapping process.

With this, the first peak luminance of the second region that is the region of the video excluding the first region including graphics is calculated, and the tone mapping process of decreasing a luminance higher than the first peak luminance is performed on the video. In other words, in the video, a luminance higher than the first peak luminance which is the peak luminance of the main video is decreased. Accordingly, when the video includes a region having a luminance higher than that of the main video, i.e., when the first region includes a region having a luminance higher than that of the main video, it is possible to decrease the luminance of the region having a luminance higher than that of the main video. Accordingly, it is possible to easily adjust the luminance of the first region including graphics.

It is to be noted that these general or specific aspects may be implemented as a system, an integrated circuit, a computer program, or a non-transitory computer-readable recording medium such as a CD-ROM, or any combination of systems, integrated circuits, computer programs and non-transitory recording media.

Hereinafter, an embodiment is described in details with reference to the drawings. It is to be noted that the excessively detailed explanation may be omitted. For example, the detailed explanation of a well-known matter or the same explanation for the substantially the same configuration may be omitted. This is to avoid the unnecessary redundancy in the following description and help those skilled in the art to understand the embodiment.

It is to be noted that the inventors provide the accompanying drawings and the following descriptions in order to enable those skilled in the art to fully understand this disclosure, and which is not intended to limit the subject matter recited in claims.

Embodiment 1

Hereinafter, Embodiment 1 is described with reference to FIG. 1 through FIG. 14.

(1-1. Configuration)

FIG. 1 is a drawing illustrating the configuration of an AV system according to Embodiment 1.

As shown in FIG. 1, AV system 1 includes video processing device 100 and display 200. Video processing device 100 and display 200 are communicatably connected to each other by cable 300 supporting a digital interface (e.g., High-Definition Multimedia Interface (HDMI (registered trademark))). It is to be noted that it is sufficient that video processing device 100 and display 200 are connected using a digital interface, and the connection configuration may be wired or wireless.

Video processing device 100 is a source device, e.g., a recorder device that can receive high-definition broadcast or 4K broadcast and records it on a recording medium such as a hard disk drive (HDD) or an optical disk, or a reproduction device (an Ultra HD Blu-ray (registered trademark) player) that can reproduce video data recorded on an optical disk. Video processing device 100 may be an Ultra HD Blu-ray (registered trademark) player or a Set Top Box (STB) that receives video data distribution supporting HDR through Video On Demand (VOD) and provides the received video data to display 200. Video processing device 100 converts the first video signal included in the first video data obtained from an optical disk or through VOD to the second video signal, and outputs the second video data including the second video signal to display 200 via cable 300.

Display 200 is a sink device, e.g., a TV capable of displaying a HDR video (hereinafter, referred to as "HDR TV"). Display 200 obtains the second video data via cable 300 and displays the video of the second video signal (HDR video) included in the obtained second video data.

Here, EOTF is described with reference to FIG. 2A and FIG. 2B.

Figure 2A:
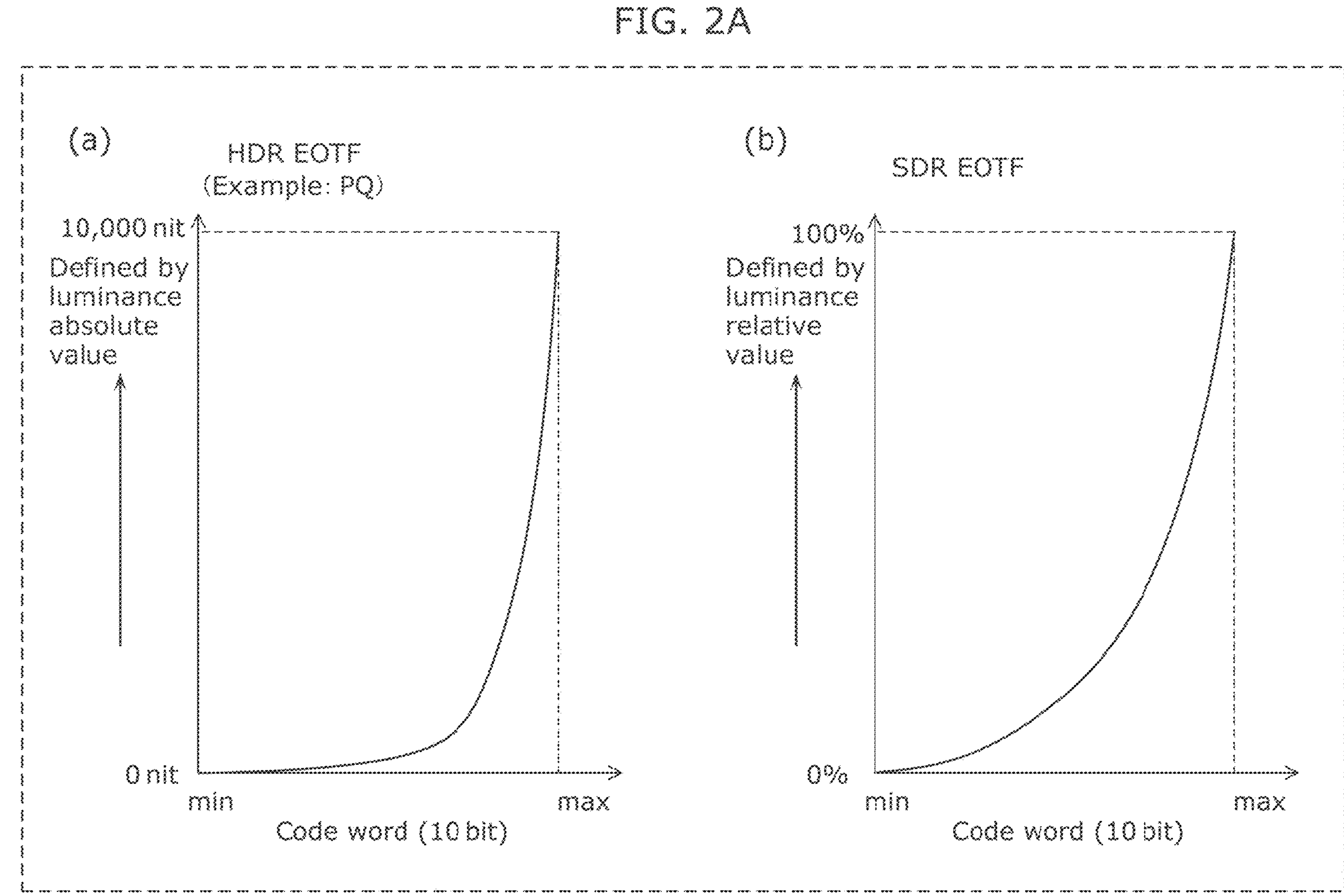
FIG. 2A is a drawing illustrating an example of EOTF for HDR and EOTF for SDR.

FIG. 2A is a drawing illustrating an example of EOTF for HDR and EOTF for SDR. Part (a) of FIG. 2A is a diagram illustrating an example of EOTF for HDR (Perceptual Quantizer (PQ) curve), and Part (b) of FIG. 2A is a diagram illustrating an example of EOTF for SDR (gamma curve).

As shown in FIG. 2A, EOTF indicates the correspondence between the code word and the luminance value, and is used to convert the code word to the luminance value. In other words, EOTF is relationship information indicating the relationship between code words and luminance values.

Figure 2B:
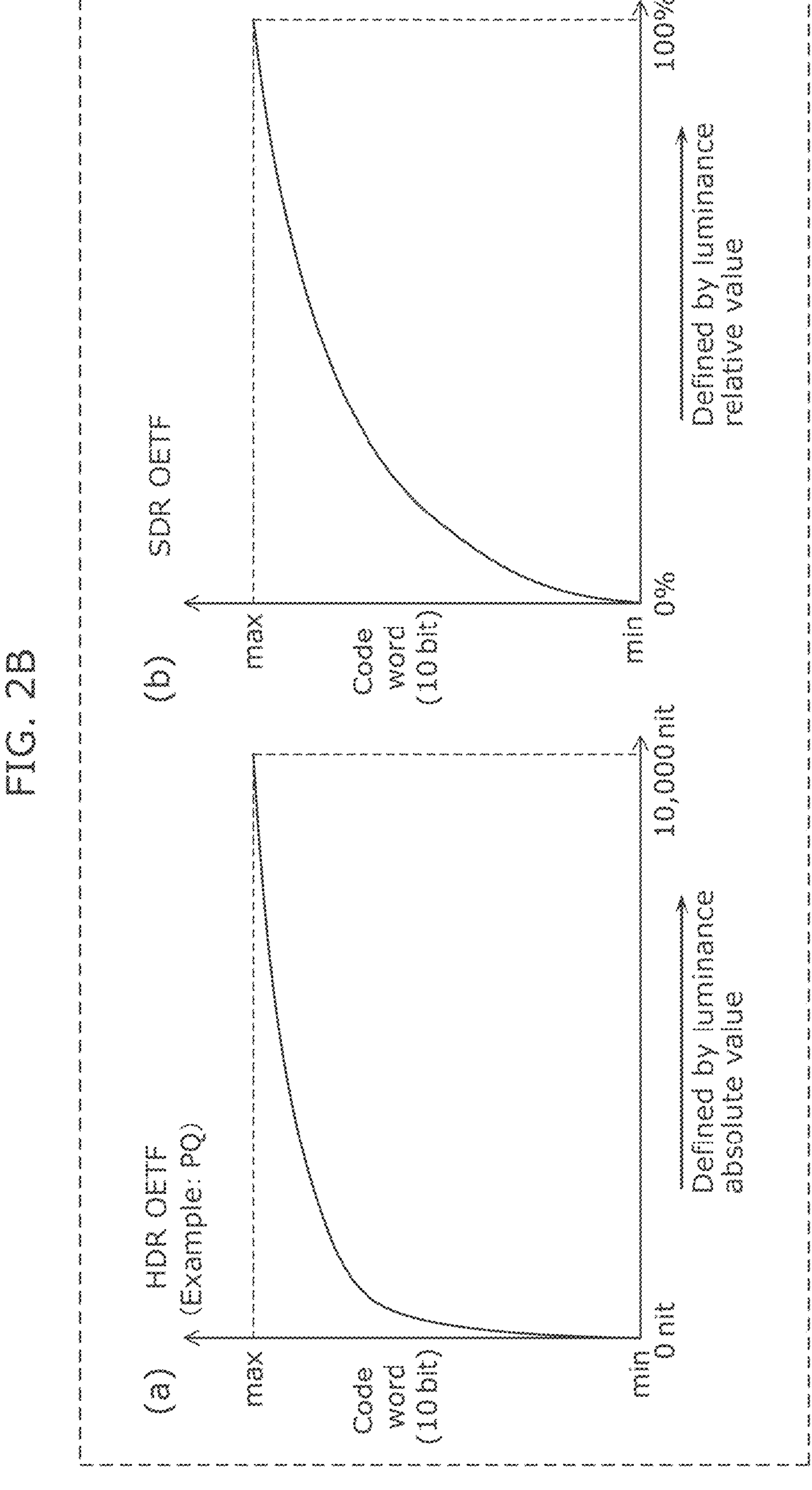
FIG. 2B is a drawing illustrating an example of OETF for HDR and OETF for SDR.

Moreover, FIG. 2B is a drawing illustrating an example of OETF for HDR and OETF for SDR. Part (a) of FIG. 2B is a diagram illustrating an example of OETF for HDR (inverse characteristics of the PQ curve), and Part (b) of FIG. 2B is a diagram illustrating an example of OETF for SDR (inverse characteristics of the gamma curve).

OETF indicates the correspondence between the luminance value and the code word, and is used to convert the luminance value to the code word, contrary to EOTF. In other words, OETF is relationship information indicating the relationship between luminance values and code words. For example, when the luminance value of a HDR video is represented using 10-bit code words, the luminance value in the HDR luminance range of up to 10,000 nits is quantized and mapped to an integer value ranging from 64 to 940 (limited range). It is to be noted that the luminance value of the HDR video may be mapped to an integer value ranging from 0 to 1023 (full range). In other words, the quantization is performed based on OETF to convert the luminance value in the luminance range of up to 10,000 nits (the luminance value of the HDR video) to a HDR signal formed by 10-bit code words. EOTF for HDR (hereinafter, referred to as "HDR EOTF") or OETF for HDR (hereinafter, referred to as "HDR OETF") can represent a luminance value higher than that of EOTF for SDR (hereinafter, referred to as "SDR EOTF") or OETF for SDR (hereinafter, referred to as "SDR OETF"). For example, in FIG. 2A and FIG. 2B, the maximum luminance (peak luminance) is 10,000 nits. In other words, HDR includes the entire luminance range of SDR, and the maximum luminance of HDR is higher than that of SDR. HDR is a dynamic range in which the maximum value is enlarged from 100 nits, which is the maximum luminance of SDR, to the maximum luminance of HDR (e.g., 10,000 nits).

Here, the first video signal in this example is a HDR signal for HDR. An image after grading is converted to a non-linear first video signal using HDR OETF, and image encoding or the like is performed based on this first video signal to generate a video stream. For example, in reproducing a video, display 200 converts the decoded stream to a linear signal using HDR EOTF, and displays the HDR video.

Next, the functional configuration of video processing device 100 is described.

Figure 3:
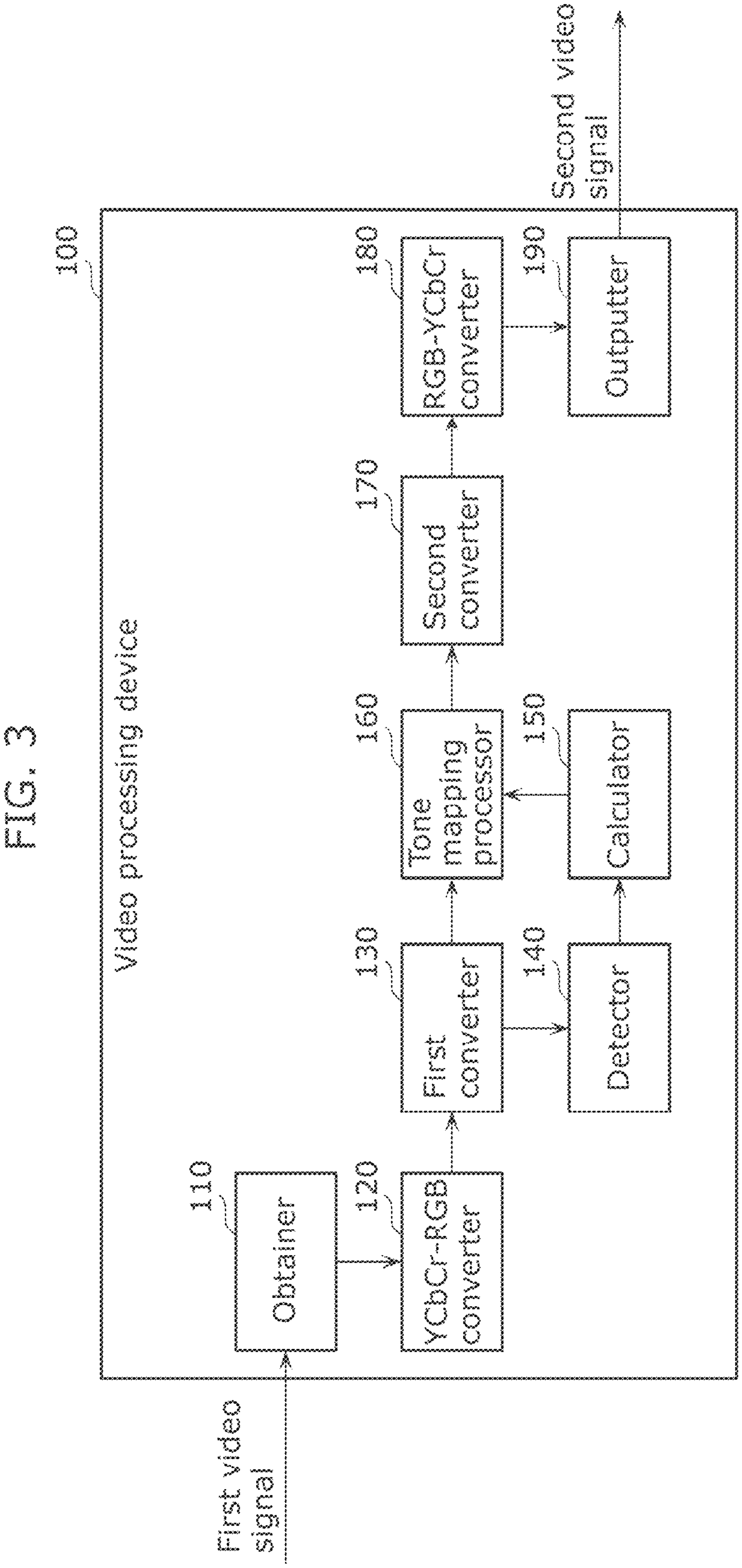
FIG. 3 is a block diagram illustrating an example of the functional configuration of a video processing device according to Embodiment 1.

FIG. 3 is a block diagram illustrating an example of the functional configuration of the video processing device according to Embodiment 1.

As shown in FIG. 3, video processing device 100 includes obtainer 110, YCbCr-RGB converter 120, first converter 130, detector 140, calculator 150, tone mapping processor 160, second converter 170, RGB-YCbCr converter 180, and outputter 190.

Obtainer 110 obtains the first video data including the non-linear first video signal generated using the first OETF. The first video signal is a HDR video signal.

As described above, obtainer 110 may obtain the first video data by reproducing the first video data recorded on an optical disk, may obtain the first video data by receiving the first video data distribution supporting HDR via the Internet from the external device such as a server, or may obtain the first video data from airwaves received by antenna which is not shown. It is to be noted that obtainer 110 may be implemented by an optical disk drive that reads and reproduces data recorded on the optical disk, or may be implemented by a communication interface for connecting to a content provider via a network such as the Internet. Moreover, obtainer 110 may be implemented by a tuner or the like that decodes the first video data from airwaves.

It is to be noted that, in the following descriptions, it is assumed that the first video represented by the first video signal is a video in which graphics are overlaid on the main video, i.e., a video with graphics embedded into the main video. It is to be noted that the first video represented by the first video signal need not be a video with graphics embedded into the main video. In the case of a video with the embedded graphics, video processing device 100 can adjust the luminance of the graphics according to the luminance of the main video.

Moreover, the first video represented by the first video signal may be a moving picture including frames. First converter 130, detector 140, calculator 150, tone mapping processor 160, second converter 170, and RGB-YCbCr converter 180 as described below perform the respective processes for each of the frames. It is to be noted that outputter 190 may perform the process for each of the frames, or for each of units of frames.

YCbCr-RGB converter 120 converts a video signal which is a YCbCr signal to an RGB signal. YCbCr-RGB converter 120 converts the first video signal from a YCbCr signal to an RGB signal, and thereby outputs the first RGB signal including the first R signal, the first G signal, and the first B signal.

Here, FIG. 4 is a diagram for describing processes performed by first converter 130, tone mapping processor 160, and second converter 170.

As shown in part (a) of FIG. 4, first converter 130 converts the first RGB signal to a linear signal using EOTF. EOTF has inverse characteristics of the first OETF. In the present embodiment, first converter 130 converts each of the first R signal, the first G signal, and the first B signal included in the first RGB signal to a linear signal using EOTF.

Detector 140 detects, in the region of the first video represented by the first RGB signal, the first region including graphics different from the main video. Detector 140 may detect the first region from the third region in the region of the first video. The third region is a predetermined region in which the possibility of including graphics is high.

Here, a specific example of the method of detecting the first region is described with reference to FIG. 5 through FIG. 8.

Figure 5:
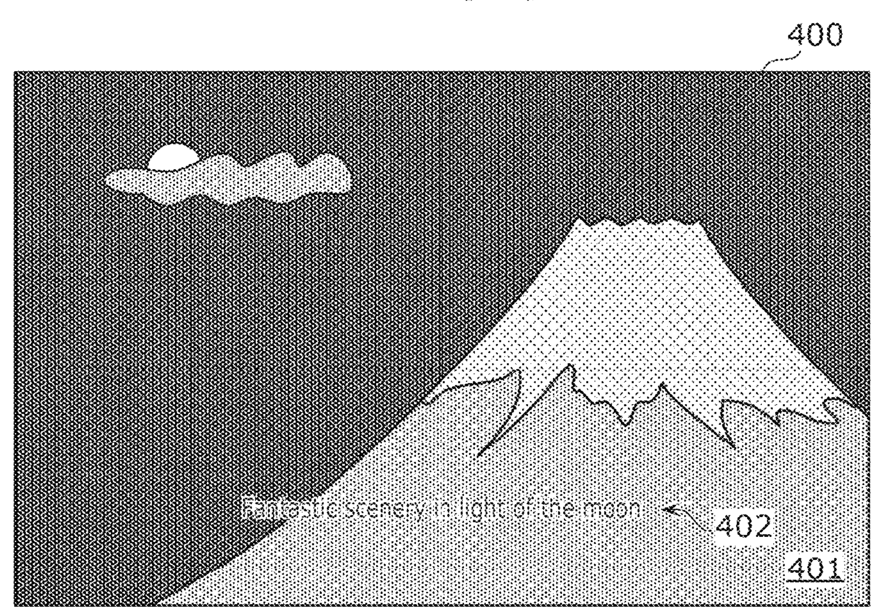
FIG. 5 is a diagram illustrating an example of a video with embedded graphics (subtitles).
Figure 6:
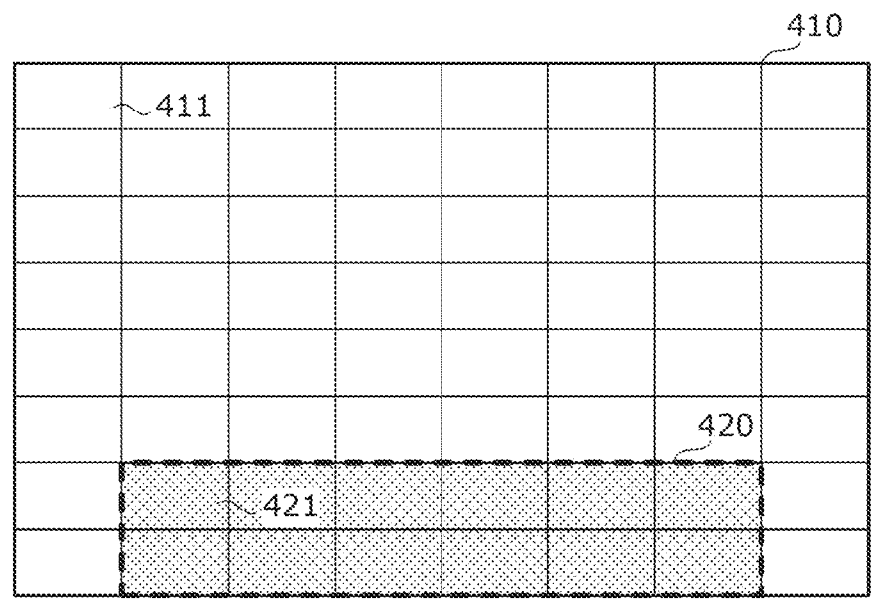
FIG. 6 is a diagram illustrating an example of region division for detecting the first region from the video.
Figure 7:
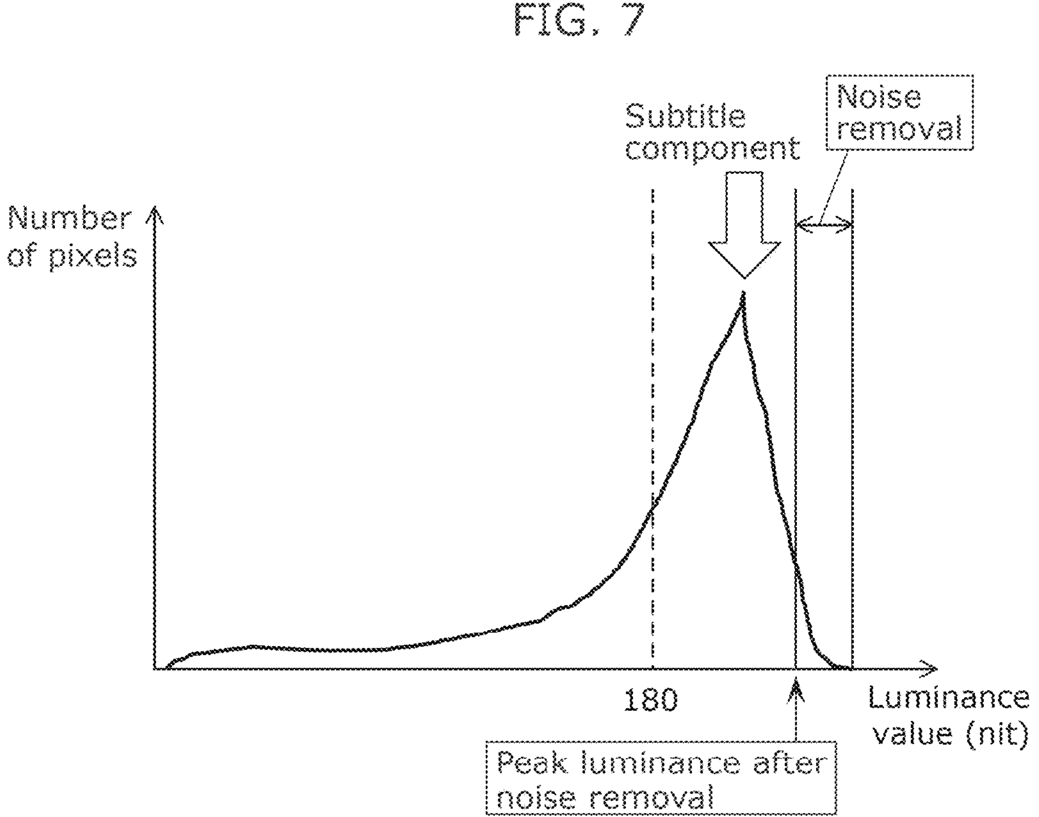
FIG. 7 is a diagram illustrating an example of the histogram of a block including graphics.
Figure 8:
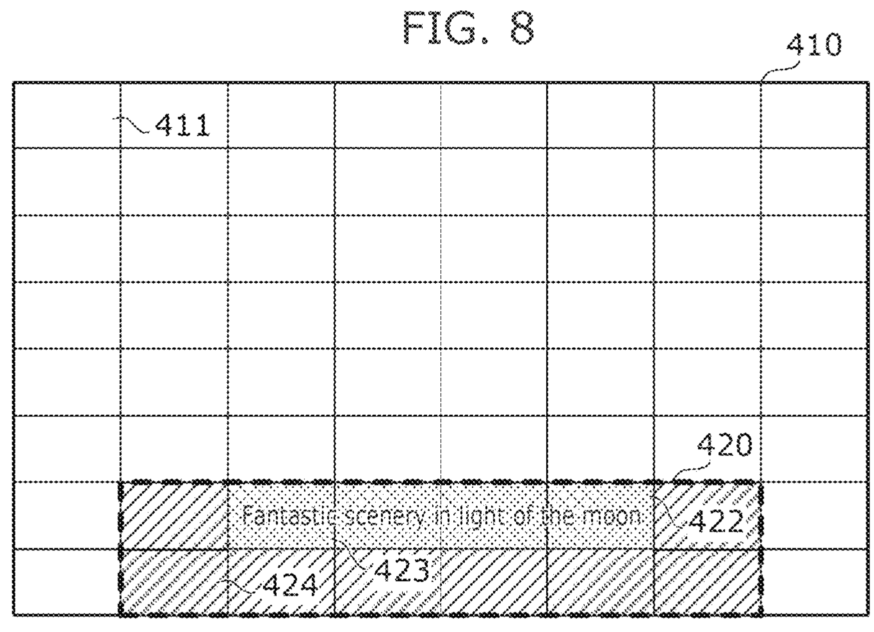
FIG. 8 is a diagram illustrating an example in which a region including the graphics of FIG. 5 is detected as the first region.

FIG. 5 is a diagram illustrating an example of a video with embedded graphics (subtitles). FIG. 6 is a diagram illustrating an example of region division for detecting the first region from the video. FIG. 7 is a diagram illustrating an example of the histogram of a block including graphics. FIG. 8 is a diagram illustrating an example in which a region including the graphics of FIG. 5 is detected as the first region. It is to be noted that, for ease of description, FIG. 8 is drawn as a diagram including only subtitles 402 as the graphics in video 400 shown in FIG. 5.

As shown in FIG. 5, video 400 is a video with subtitles 402 embedded into main video 401, i.e., an example of the first video. Subtitles 402 are usually arranged in a bottom region of video 400. Accordingly, as shown in FIG. 6, third region 420 is set in a bottom region of region 410. Region 410 corresponds to the entire region of video 400. For example, region 410 may be divided into 64 blocks 411 of 8×8, in which the region of total 12 blocks 421 located in 2 bottom rows each including 6 blocks is set as third region 420. In FIG. 6, third region 420 is surrounded by the dashed line. 12 blocks 421 is an example of one or more sub regions. In other words, third region 420 is not limited to including 12 blocks 421, and may include one or more blocks (sub regions).

For each of 12 blocks 421 constituting predetermined third region 420 in the region of video 400, detector 140 calculates the second peak luminance of the block. More specifically, as shown in FIG. 7, detector 140 calculates, from the pixel values of pixels in each block 421, the luminance values of the pixels, and generates, based on the pixels in each block 421 and the calculated luminance values, a histogram whose vertical scale is the number of pixels and whose horizontal scale is the luminance value. Using the generated histogram, detector 140 removes, as noise, the luminance values of top X pixels in descending order of luminance value, where X is the first number. Detector 140 calculates, as the second peak luminance, the maximum luminance value among the luminance values of the remaining pixels after the noise removal. It is to be noted that the first number may be determined based on the first ratio which is a ratio of the first number to the total number of pixels in the block. In other words, the first number may be calculated by multiplying the total number of pixels in the block by the first ratio.

It is to be noted that detector 140 need not generate a histogram to calculate the second peak luminance. The luminance values of pixels in each block 421 are ordered in descending order, and the luminance values of top X pixels in descending order of luminance value may be removed as noise, where X is the first number. Moreover, detector 140 may calculate, as the second peak luminance, the maximum luminance value among the luminance values of pixels in each block 421 without performing the noise removal.

Next, detector 140 determines whether the calculated second peak luminance is higher than a predetermined threshold (e.g., 180 nits). When the second peak luminance is higher than the predetermined luminance value, detector 140 determines that current block 421 includes graphics. In contrast, when the second peak luminance is not higher than the predetermined luminance value, detector 140 determines that current block 421 does not include graphics.

Next, as shown in FIG. 8, detector 140 detects, as first region 422, a region formed by combining one or more blocks 423 among 12 blocks 421, each of which is determined to have the second peak luminance higher than the predetermined threshold, i.e., one or more blocks 423 determined to include graphics. In other words, one or more blocks 423 constitute first region 422. Moreover, among 12 blocks 421 constituting third region 420, one or more blocks 424 determined not to include graphics are treated as a region including the main video (i.e., the second region) together with region 410 excluding third region 420.

Figure 9:
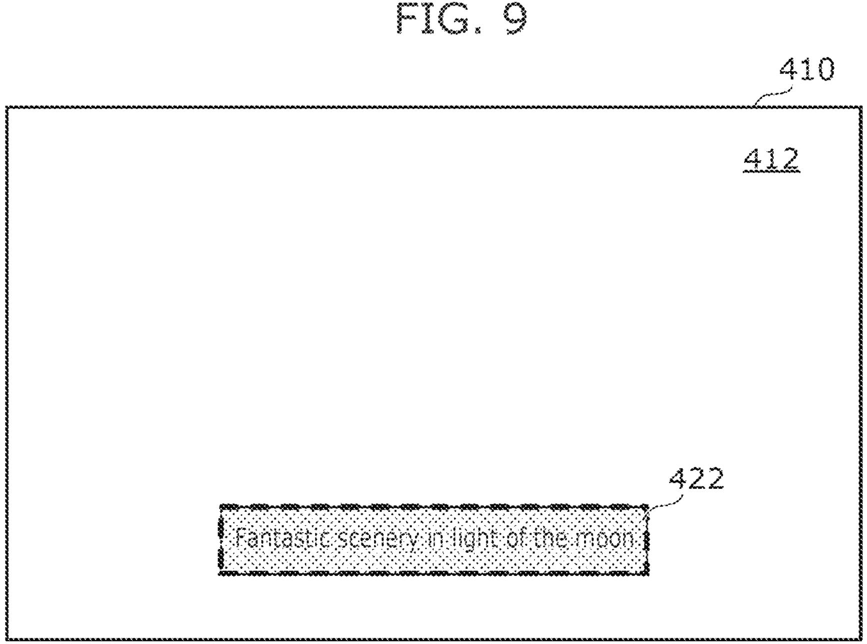
FIG. 9 is a diagram illustrating an example of the second region and the first region detected by the detector.

In this manner, as shown in FIG. 9, detector 140 detects, in the region of video 400, first region 422 including graphics different from the main video and second region 412 which is the region of video 400 excluding first region 422.

Figure 10:
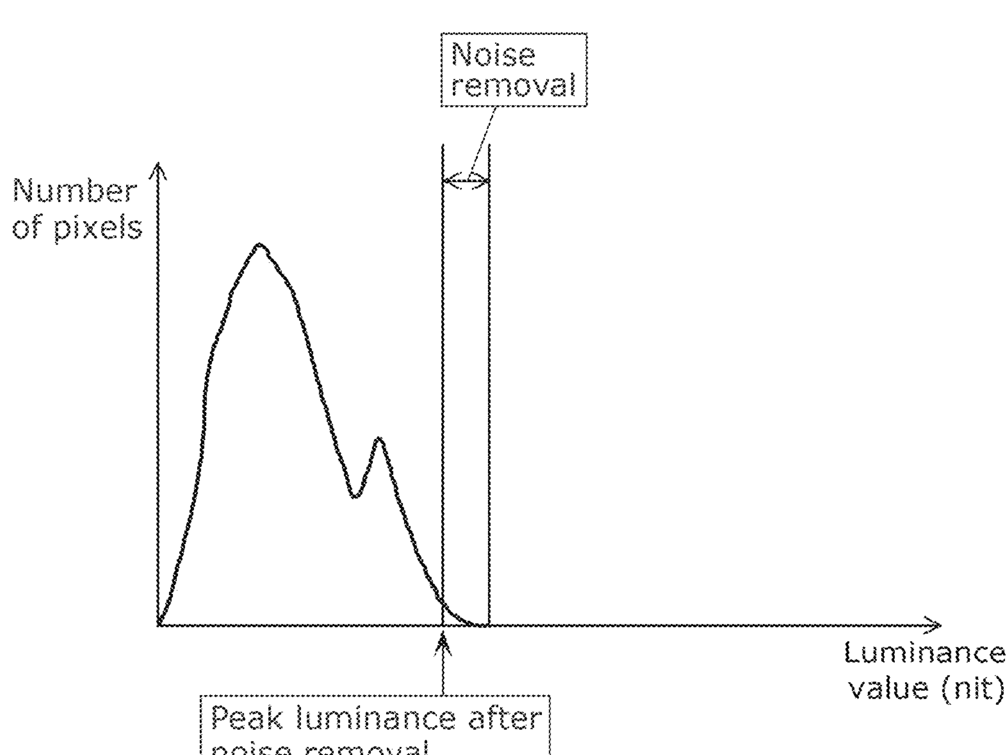
FIG. 10 is a diagram illustrating an example of the histogram of the second region.
Figure 11:
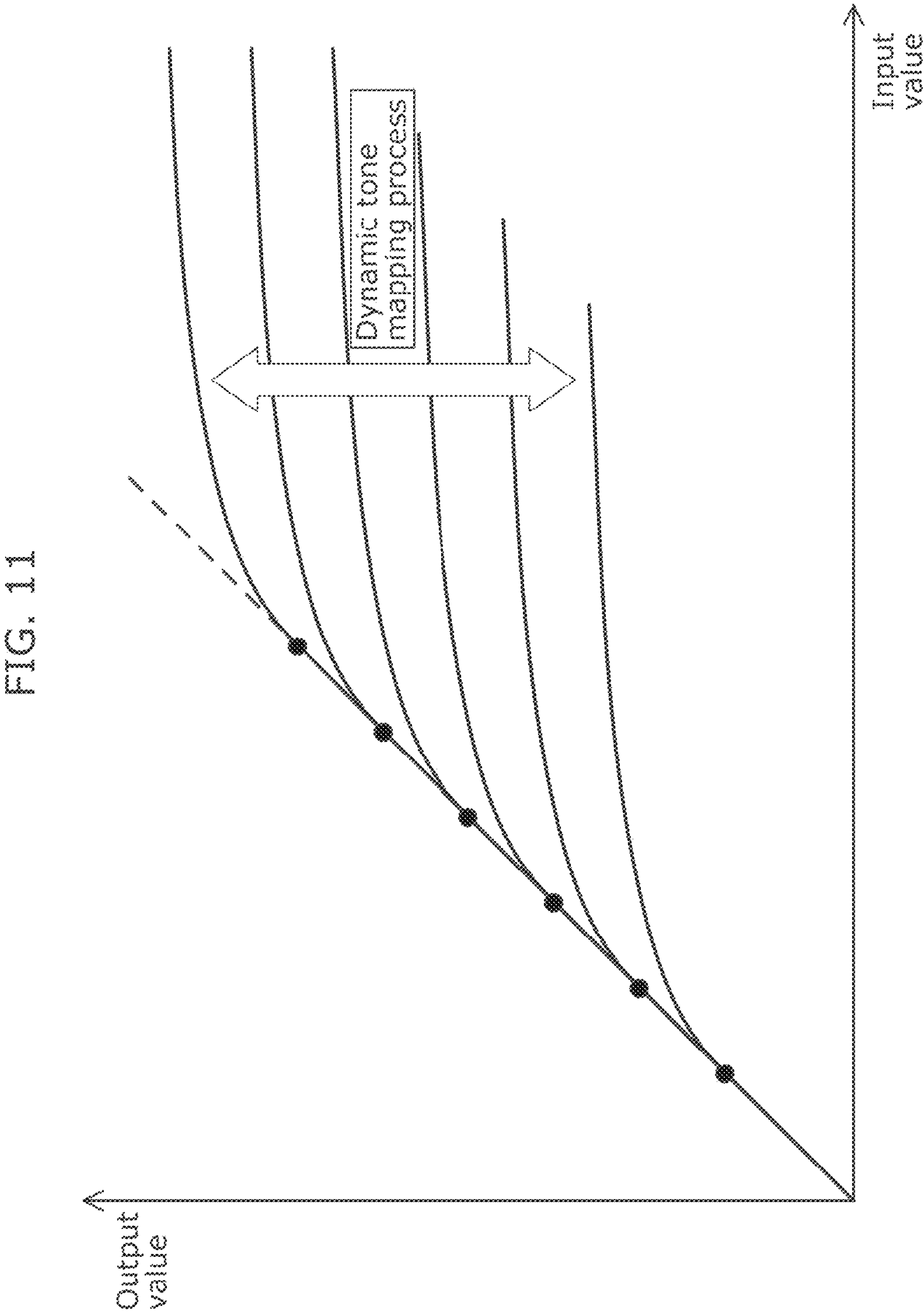
FIG. 11 is a diagram illustrating an example of tone curves for use in the tone mapping process.

Calculator 150 calculates the first peak luminance of second region 412 of video 400. More specifically, as shown in FIG. 10, calculator 150 calculates, from the pixel values of pixels in second region 412 of video 400, the luminance values of the pixels, and generates, based on the pixels in second region 412 of video 400 and the calculated luminance values, a histogram whose vertical scale is the number of pixels and whose horizontal scale is the luminance value. Using the generated histogram, calculator 150 removes, as noise, the luminance values of top Y pixels in descending order of luminance value, where Y is the second number. Calculator 150 calculates, as the first peak luminance, the maximum luminance value among the luminance values of the remaining pixels after the noise removal. It is to be noted that the second number may be determined based on the second ratio which is a ratio of the second number to the total number of pixels in second region 412. In other words, the second number may be calculated by multiplying the total number of pixels in second region 412 by the second ratio.

As shown in part (b) of FIG. 4, tone mapping processor 160 performs a tone mapping process on the linear signal obtained by first converter 130, according to the first peak luminance calculated by calculator 150. More specifically, tone mapping processor 160 performs, as the tone mapping process, a process that does not decrease the luminance of an input value lower than or equal to the first peak luminance and decreases the luminance of an input value higher than the first peak luminance, on the first video represented by the first video signal converted to the linear signal. Tone mapping processor 160 performs the tone mapping process on all the pixels constituting the first video represented by the first video signal.

For example, when a luminance input value is in a range of 0 to the first peak luminance, inclusive, tone mapping processor 160 outputs a value equal to the luminance input value as an output value. Moreover, when a luminance input value is in a range above the first peak luminance, tone mapping processor 160 outputs a value less than the luminance input value as an output value. For example, when a luminance input value is in a range above the first peak luminance, tone mapping processor 160 may output an output value corresponding to the luminance input value in a relationship between an input value and an output value in which the output value increases at an increase rate as the luminance input value increases, where the increase rate decreases with an increase in the luminance input value. In other words, tone mapping processor 160 performs a dynamic tone mapping process in which when the first peak luminance calculated by calculator 150 changes, the relationship for use in the tone mapping process also changes. For example, tone mapping processor 160 uses, among the tone curves shown in FIG. 11, a tone curve having a larger maximum output value for a higher first peak luminance, to perform the tone mapping process.

It is to be noted that the relationship between the input value and the output value may be represented by a tone curve, a relational expression, or a table. In the present embodiment, tone mapping processor 160 performs the tone mapping process described above on the linear signal obtained by converting each of the first R signal, the first G signal, and the first B signal using EOTF.

Figure 12:
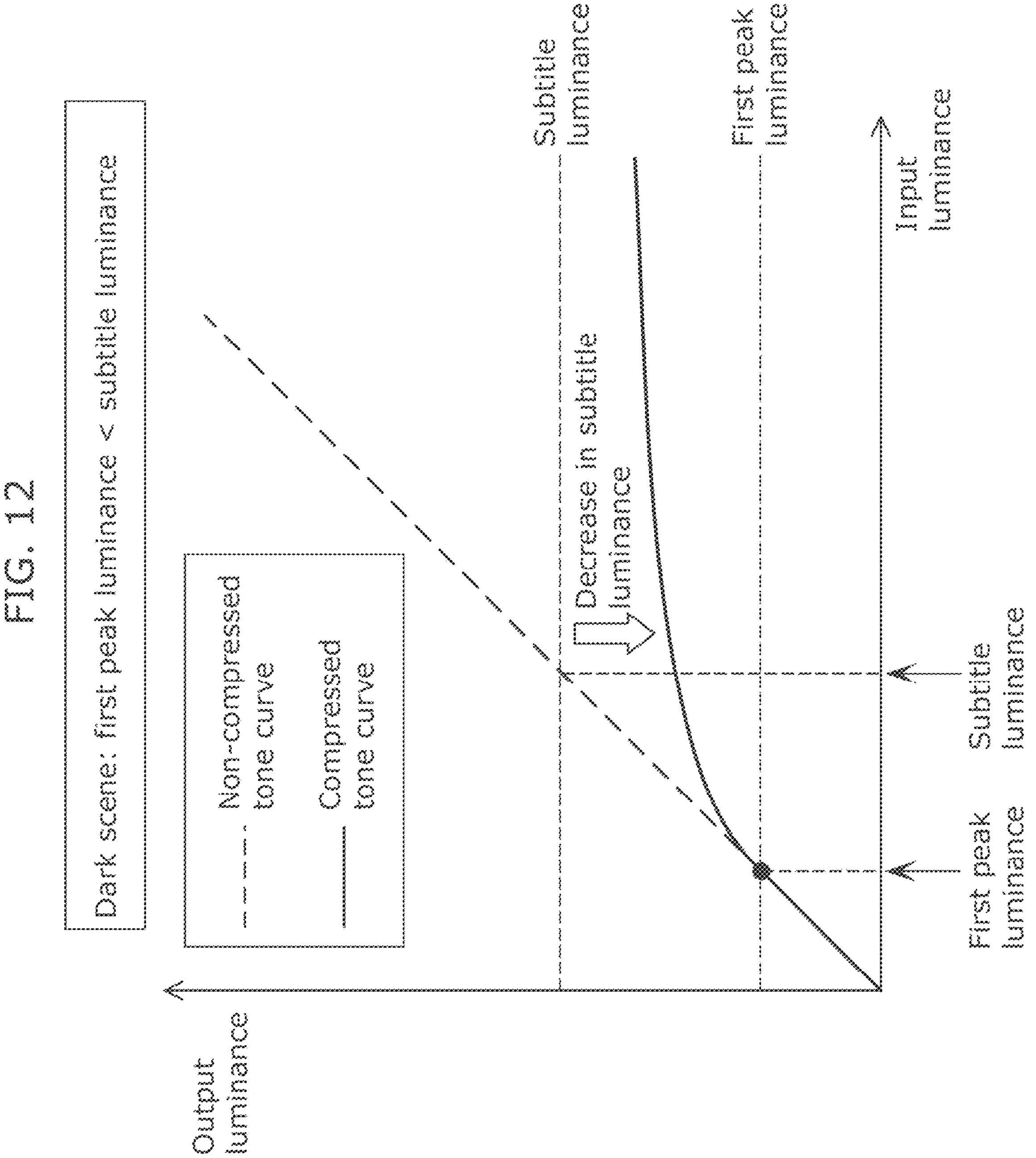
FIG. 12 is a diagram for describing an example of the tone mapping process when the video is a dark scene.
Figure 13:
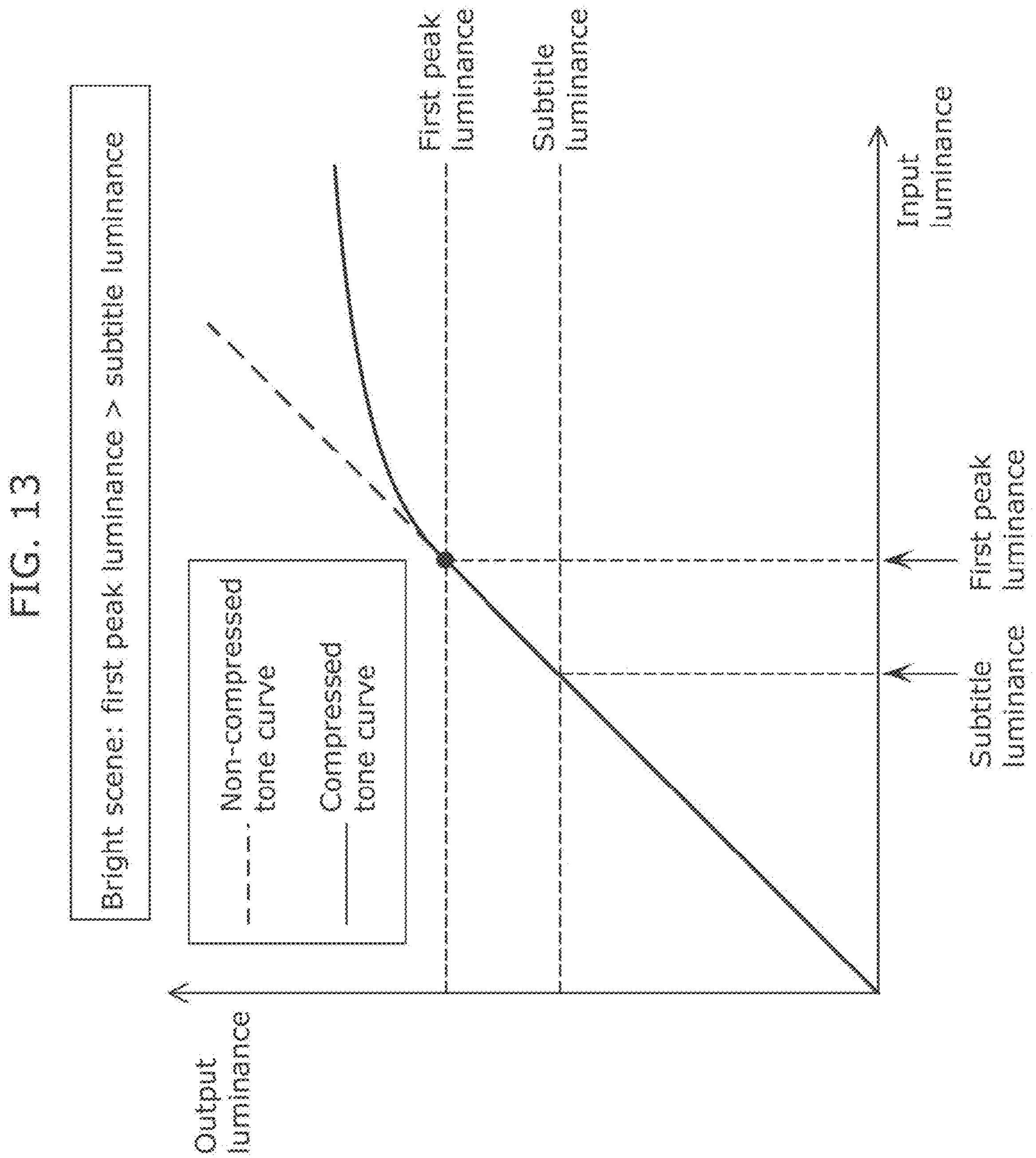
FIG. 13 is a diagram for describing an example of the tone mapping process when the video is a bright scene.

Here, the tone mapping process according to the first peak luminance is described with reference to FIG. 12 and FIG. 13. FIG. 12 is a diagram for describing an example of the tone mapping process when the video is a dark scene. FIG. 13 is a diagram for describing an example of the tone mapping process when the video is a bright scene.

For example, as shown in FIG. 12, when the first video is a dark scene (i.e., when the first peak luminance is lower than the subtitle luminance), the subtitle luminance is higher than the peak luminance of the main video excluding the subtitles (the first peak luminance). Accordingly, tone mapping processor 160 can decrease the luminance of the subtitles without decreasing the luminance of the main video, by performing the tone mapping process that decreases a luminance higher than the first peak luminance. Moreover, as shown in FIG. 13, when the first video is a bright scene (i.e., when the first peak luminance is higher than the subtitle luminance), the subtitle luminance is lower than the peak luminance of the main video (the first peak luminance). Accordingly, the luminance of the main video and the luminance of the subtitles are not decreased even when tone mapping processor 160 performs the tone mapping process that decreases a luminance higher than the first peak luminance. As described above, tone mapping processor 160 performs the tone mapping process using conversion characteristics according to the first peak luminance, and thus it is possible to perform the tone mapping process according to the relationship between the peak luminance of the main video and the luminance of the subtitles.

As shown in part (c) of FIG. 4, second converter 170 generates the second video signal by converting, using the second OETF, the processed linear signal obtained by tone mapping processor 160 performing the tone mapping process. In other words, the second video signal represents the second video after the tone mapping process. In the present embodiment, second converter 170 converts, using the second OETF, each of RGB of the processed linear signal which is the RGB signal. As a result of the conversion using the second OETF in second converter 170, the second R signal, the second G signal, and the second B signal are generated, and the second signal including the generated second R signal, the generated second G signal, and the generated second B signal is outputted.

It is to be noted that the first video signal inputted to first converter 130 may be a HDR signal of PQ characteristics or a HDR signal of Hybrid Log-Gamma (HLG) characteristics. When the first video signal is a HDR signal of PQ characteristics, first converter 130 converts a non-linear first video signal to a linear signal using PQ EOTF as EOTF. When the first video signal is a HDR signal of HLG characteristics, first converter 130 converts a non-linear first video signal to a linear signal using the inverse characteristics of HLG OETF as EOTF.

Moreover, the second video signal outputted from second converter 170 may be a HDR signal of PQ characteristics or a HDR signal of HLG characteristics. For example, it is sufficient that second converter 170 outputs a HDR signal of the characteristics supported by display 200. When a HDR signal of PQ characteristics is outputted as the second video signal, second converter 170 generates a non-linear second video signal using the inverse characteristics of PQ EOTF as the second OETF. When a HDR signal of HLG characteristics is outputted as the second video signal, second converter 170 generates a non-linear second video signal using HLG OETF as the second OETF.

As described above, the first OETF and the second OETF may be the same or different.

It is to be noted that the first video signal is assumed to be a HDR signal, but the present disclosure is not limited to this. The first video signal may be a SDR signal generated using OETF for SDR (part (b) of FIG. 2B). In this case, EOTF for SDR (part (b) of FIG. 2A) is used as EOTF. Moreover, OETF for SDR is used as the second OETF.

It is to be noted that, for example, each of YCbCr-RGB converter 120, first converter 130, detector 140, calculator 150, tone mapping processor 160, and second converter 170 may be implemented by a processor that executes a program and a memory that stores the program, or may be implemented by a dedicated circuit.

RGB-YCbCr converter 180 converts a video signal which is an RGB signal to a YCbCr signal. RGB-YCbCr converter 180 converts the second video signal outputted from second converter 170 from an RGB signal to a YCbCr signal. In this manner, RGB-YCbCr converter 180 outputs the second video signal which is a YCbCr signal obtained by the conversion. It is to be noted that, for example, RGB-YCbCr converter 180 may be implemented by a processor that executes a program and a memory that stores the program, or may be implemented by a dedicated circuit.

Outputter 190 outputs the second video signal obtained by the conversion in RGB-YCbCr converter 180. For example, outputter 190 outputs the second video signal to display 200. In the present embodiment, outputter 190 outputs the second video data including the second video signal. For example, outputter 190 may be implemented by a digital interface.

(1-2. Operation)

The following describes the operation of video processing device 100 configured as described above.

Figure 14:
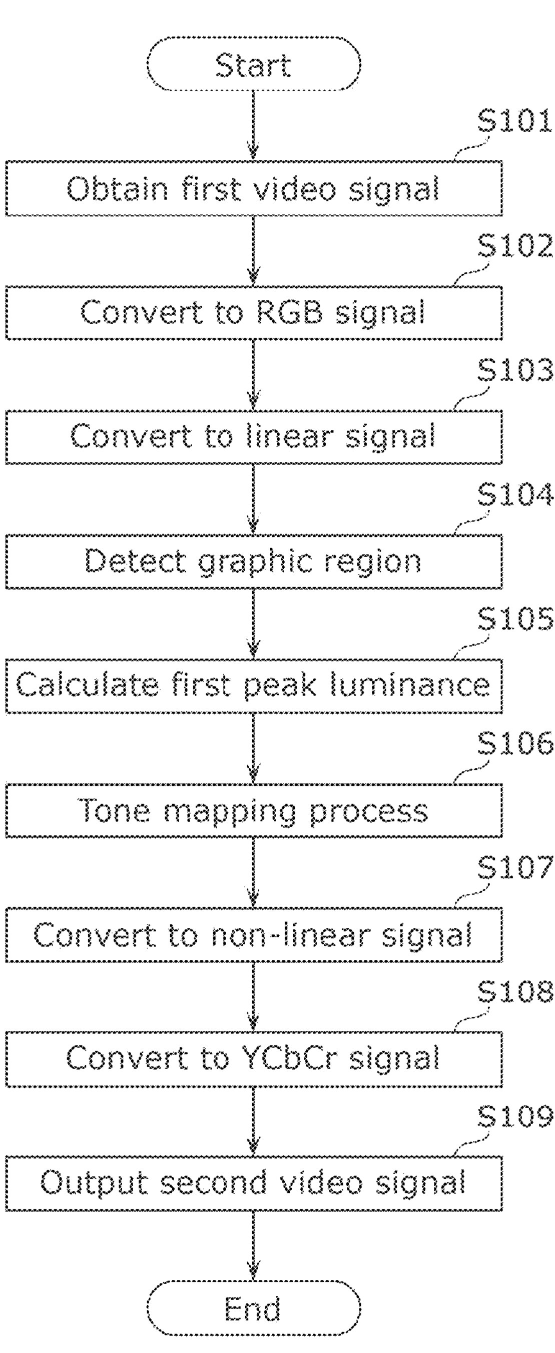
FIG. 14 is a flowchart illustrating an example of the operation of the video processing device (video processing method) according to Embodiment 1.

FIG. 14 is a flowchart illustrating an example of the operation of the video processing device (video processing method) according to Embodiment 1.

Video processing device 100 obtains a first video signal (S101). Step S101 is a process performed by obtainer 110.

Next, video processing device 100 converts the first video signal obtained by obtainer 110 from the YCbCr signal to the RGB signal (S102). Step S102 is a process performed by YCbCr-RGB converter 120.

Next, video processing device 100 converts the first video signal converted to the RGB signal to the linear signal using the inverse characteristics of the first OETF (S103). Step S103 is a process performed by first converter 130.

Next, in the region of video 400 represented by the first video signal converted to the linear signal, video processing device 100 detects first region 422 (graphic region) including graphics different from the main video (S104). Step S104 is a process performed by detector 140.

Next, video processing device 100 calculates the first peak luminance of second region 412 that is the region of video 400 excluding first region 422 (S105). Step S105 is a process performed by calculator 150.

Next, video processing device 100 performs, on video 400 represented by the first video signal converted to the linear signal, a tone mapping process of decreasing a luminance higher than the first peak luminance (S106). Step S106 is a process performed by tone mapping processor 160.

It is to be noted that Steps S104 and S105 and Step S106 need not be performed in this order. Step S106 may be performed before Step S104, or Steps S104 and S105 and Step S106 may be performed in parallel.

Next, video processing device 100 generates a second video signal by converting, using the second OETF, the processed linear signal obtained by performing the tone mapping process (S107). Step S107 is a process performed by second converter 170.

Next, video processing device 100 converts the second video signal from the RGB signal to the YCbCr signal (S108). Step S108 is a process performed by RGB-YCbCr converter 180.

Next, video processing device 100 outputs the second video signal converted from the RGB signal to the YCbCr signal (S109). Step S109 is a process performed by outputter 190.

(1-3. Effect, etc.)

Video processing device 100 according to the present embodiment includes obtainer 110, detector 140, calculator 150, tone mapping processor 160, and outputter 190. Obtainer 110 obtains a first video signal. Detector 140 detects, from a video represented by the first video signal obtained by obtainer 110, first region 422 including graphics different from the main video. Calculator 150 calculates the first peak luminance of second region 412 that is region 410 of video 400 excluding first region 422. Tone mapping processor 160 performs, on the video, a tone mapping process of decreasing a luminance higher than the first peak luminance. Outputter 190 outputs a second video signal representing a video after the tone mapping process.

With this, the first peak luminance of second region 412 that is region 410 of video 400 excluding first region 422 including graphics is calculated, and the tone mapping process of decreasing a luminance higher than the first peak luminance is performed on the video. In other words, in the video, a luminance higher than the first peak luminance which is the peak luminance of the main video is decreased. Accordingly, when the video includes a region having a luminance higher than that of the main video, i.e., when first region 422 includes a region having a luminance higher than that of the main video, it is possible to decrease the luminance of the region having a luminance higher than that of the main video. Accordingly, it is possible to easily adjust the luminance of first region 422 including graphics.

Moreover, in video processing device 100 according to the present embodiment, video 400 is a moving picture including frames. Detection of first region 422 by detector 140, calculation of the first peak luminance by calculator 150, and the tone mapping process by tone mapping processor 160 are performed for each of the frames.

With this, video processing device 100 performs the processes for each of the frames included in the video, and thus it is possible to perform the tone mapping process according to the luminance of each frame.

Moreover, in video processing device 100 according to the present embodiment, in detecting first region 422 by detector 140, for each of 12 blocks 421 constituting predetermined third region 420 in the region of video 400, the second peak luminance of block 421 is calculated. In detecting first region 422, a region formed by combining 12 blocks 421 among 12 blocks 421, each having the second peak luminance higher than the predetermined threshold is detected as first region 422. Accordingly, it is possible to easily detect first region 422 including graphics without performing a complicate process.

Moreover, in video processing device 100 according to the present embodiment, the tone mapping process by tone mapping processor 160 does not decrease a luminance lower than or equal to the first peak luminance. Accordingly, it is possible to decrease the luminance of the graphics without decreasing the luminance of the main video when the luminance of the graphics is higher than the luminance of the main video.

Moreover, in video processing device 100 according to the present embodiment, the tone mapping process by tone mapping processor 160 has a linear relationship in which an output value is equal to an input value when the luminance input value is in a range of 0 to the first peak luminance, inclusive. Accordingly, it is possible to decrease the luminance of the graphics while keeping the luminance of the main video when the luminance of the graphics is higher than the luminance of the main video.

Moreover, in video processing device 100 according to the present embodiment, when a luminance is higher than the first peak luminance, the tone mapping process by tone mapping processor 160 decreases the luminance so that the decrease rate increases as the luminance increases. Accordingly, it is possible to decrease the luminance of the graphics to cause less feeling of strangeness when the luminance of the graphics is higher than the luminance of the main video.

Embodiment 2

Next, Embodiment 4 is described with reference to FIG. 15 and FIG. 16.

(2-1. Configuration)

Figure 15:
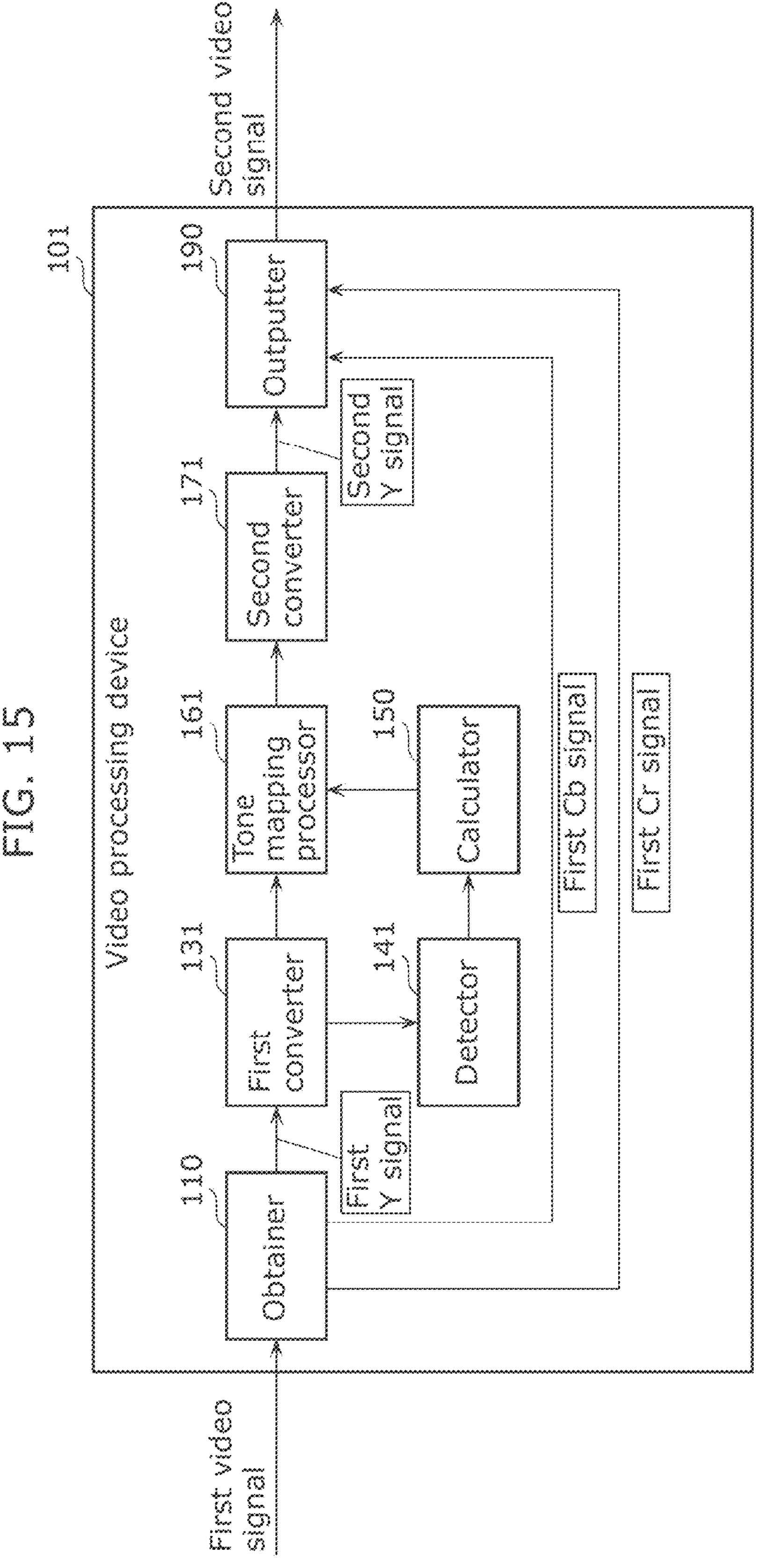
FIG. 15 is a block diagram illustrating an example of the functional configuration of a video processing device according to Embodiment 2.

FIG. 15 is a block diagram illustrating an example of the functional configuration of a video processing device according to Embodiment 2.

Video processing device 101 according to Embodiment 2 differs from video processing device 100 according to Embodiment 1 in that YCbCr-RGB converter 120 and RGB-YCbCr converter 180 are not included and first converter 131, detector 141, tone mapping processor 161 and second converter 171 do not perform the respective processes for each signal of the RGB signal. The remaining configuration of video processing device 101 is the same as that of video processing device 100, and thus its description is omitted.

First converter 131 converts the first Y signal to a linear signal, tone mapping processor 161 performs the tone mapping process on the linear signal, and second converter 171 converts the processed linear signal to a non-linear signal. In addition, detector 141 performs a detection process on the linear signal. With this, second converter 171 outputs a second Y signal. It is to be noted that the first Cb signal and the first Cr signal representing the chroma signal of the first video signal obtained by obtainer 110 are outputted to outputter 190 without performing each process in first converter 131, tone mapping processor 161, and second converter 171.

Outputter 190 outputs a second video signal including the second Y signal, the first Cb signal, and the first Cr signal.

(2-2. Operation)

Figure 16:
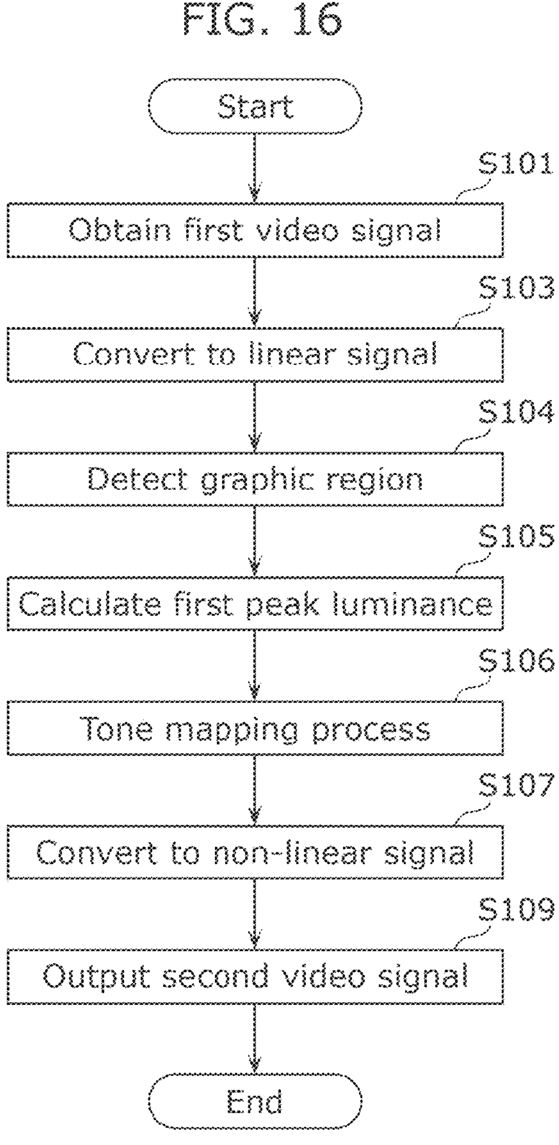
FIG. 16 is a flowchart illustrating an example of the operation of the video processing device (video processing method) according to Embodiment 2.

FIG. 16 is a flowchart illustrating an example of the operation of the video processing device (video processing method) according to Embodiment 2.

The video processing method according to Embodiment 2 differs from the video processing method according to Embodiment 1 shown in FIG. 14 in that Step S102 and Step S108 are omitted. The other steps of the video processing method are the same as those of Embodiment 1, and thus the same numerals are assigned, and their descriptions are omitted.

In other words, the processes of Steps S101, S103 through S107, and S109 are performed, and the processes of Steps S103, S106, and S107 are performed on the first Y signal of the first video signal which is a YCbCr signal.

(2-3. Effect, Etc.)

Video processing device 101 according to the present embodiment performs the conversion process on the first video signal which is a YCbCr signal, and thus it is possible to reduce the processing load.

Other Embodiments

As described above, Embodiment 1 and Embodiment 2 has been described as examples of technique disclosed in the present application. However, the technique of the present disclosure is not limited to this embodiment. The present disclosure is also applicable to embodiments optionally involving modification, replacement, addition, and omission. The components described in Embodiment 1 and Embodiment 2 may be combined to achieve another embodiment.

In view of above, the following describes an example of another embodiment.

In the above embodiment, when a luminance input value is in a range above the first peak luminance, tone mapping processor 160 outputs an output value corresponding to the luminance input value in a relationship between an input value and an output value in which the output value increases at an increase rate as the luminance input value increases, where the increase rate decreases with an increase in the luminance input value, but the present disclosure is not limited to this. When the luminance input value is in a range above the first peak luminance, the relationship need not indicate that the output value increases as the luminance input value increases. The output value may be of a certain range.

In the above embodiment, detector 140 detects the first region from the predetermined third region in the region of the video, but the present disclosure is not limited to this. Detector 140 may detect, as the first region including graphics, a region including pixels satisfying a predetermined condition among all pixels of the video. For example, the predetermined condition may be that the pixels have values within the range of pixel values that can be regarded as a predetermined color (e.g., white). Furthermore, the predetermined condition may be that at least a predetermined number of the pixels within the range of pixel values as described above are arranged adjacently.

In the above embodiment, the subtitles are illustrated as graphics, but the graphics are not limited to the subtitles. The logo of a broadcast station, the logo of a TV program, or a frame-like region or a bar (a rectangular region) surrounding the main video is also possible. The frame-like region or the bar may include characters or a logo. The position of the graphics may not be changed or may be changed in frames of the video. It is to be noted that the method disclosed in PTL 2 may be used to detect the subtitles as the graphics.

In the above embodiment, video processing devices 100 and 101 are illustrated as a source device connected to display 200, but the present disclosure is not limited to this. Video processing devices 100 and 101 may be included in the display. In other words, the video processing device included in the display may be configured to convert the first video signal to the second video signal and display the second video signal on a display (a display unit) of the display or on an external display.

It is to be noted that, in each embodiment described above, each component may be configured with dedicated hardware, or may be implemented by executing a software program suitable for the component. Each component may be implemented by a program executer such as a CPU or a processor reading and executing a software program recorded on a recording medium such as a hard disc or a semiconductor memory. Here, a software to implement the adjustment method or the like according to each embodiment described above is a program described below.

In particular, this program causes a computer to execute a video processing method including: obtaining a first video signal; detecting, in a region of a first video represented by the first video signal obtained, a first region including a graphic different from a main video; calculating a first peak luminance of a second region that is the region of the first video excluding the first region; performing a tone mapping process on the first video, the tone mapping process decreasing a luminance higher than the first peak luminance; and outputting a second video signal representing a second video after the tone mapping process.

As described above, other embodiments have been described as examples of technique in the present disclosure. The accompanying drawings and the detailed descriptions have been provided for this.

Accordingly, in order to illustrate the foregoing technique, the components described in the accompanying drawings and the detailed descriptions may include not only components required to solve the problems but also components not required to solve the problems. For this reason, the components described in the accompanying drawings and the detailed descriptions should not be always regarded as being necessary to solve the problem.

The foregoing embodiments are for illustrative purposes of the technique of the present disclosure, and thus claims or the equivalent scope thereof may involve modification, replacement, addition, and omission in various ways.

INDUSTRIAL APPLICABILITY

The present disclosure is applicable to a video processing device capable of adjusting the luminance of graphics embedded in a video. In particular, the present disclosure is applicable to Ultra HD Blu-ray (registered trademark) players, STBs, TVs, monitors, etc.

The invention claimed is:

1. A video processing method comprising:

obtaining a first video signal;

detecting, in a region of a first video represented by the first video signal obtained, a first region including a graphic different from a main video;

calculating a first peak luminance of a second region that is the region of the first video excluding the first region;

performing a tone mapping process on the first video, the tone mapping process decreasing a luminance higher than the first peak luminance; and outputting a second video signal representing a second video after the tone mapping process, wherein the first video is a moving picture including frames, and the detecting of the first region, the calculating of the first peak luminance, and the tone mapping process are performed for each of the frames.

2. The video processing method according to claim 1, wherein the detecting of the first region includes:

for each of one or more sub regions constituting a predetermined third region in the region of the first video, calculating a second peak luminance of the sub region; and detecting, as the first region, a region formed by combining one or more of the one or more sub regions, each having the second peak luminance higher than a predetermined threshold.

3. The video processing method according to claim 1, wherein the tone mapping process does not decrease a luminance lower than or equal to the first peak luminance.

4. The video processing method according to claim 3, wherein when a luminance input value is in a range of 0 to the first peak luminance, inclusive, the tone mapping process outputs a value equal to the luminance input value as an output value.

5. The video processing method according to claim 1, wherein when a luminance input value is in a range above the first peak luminance, the tone mapping process outputs an output value corresponding to the luminance input value in a relationship in which a luminance output value increases at an increase rate as the luminance input value increases, the increase rate decreasing with an increase in the luminance input value.

6. A non-transitory computer-readable recording medium storing a program for causing a computer to execute the video processing method according to claim 1.

7. A video processing device comprising:

an obtainer that obtains a first video signal;

a detector that detects, in a region of a first video represented by the first video signal obtained, a first region including a graphic different from a main video;

a calculator that calculates a first peak luminance of a second region that is the region of the first video excluding the first region;

a tone mapping processor that performs a tone mapping process on the first video, the tone mapping process decreasing a luminance higher than the first peak luminance; and an outputter that outputs a second video signal representing a second video after the tone mapping process, wherein the first video is a moving picture including frames, and the detecting of the first region, the calculating of the first peak luminance, and the tone mapping process are performed for each of the frames.

* * * * *